Sept. 23, 1930.  G. H. WHITE  1,776,483
BRINE COOLER
Filed May 14, 1929
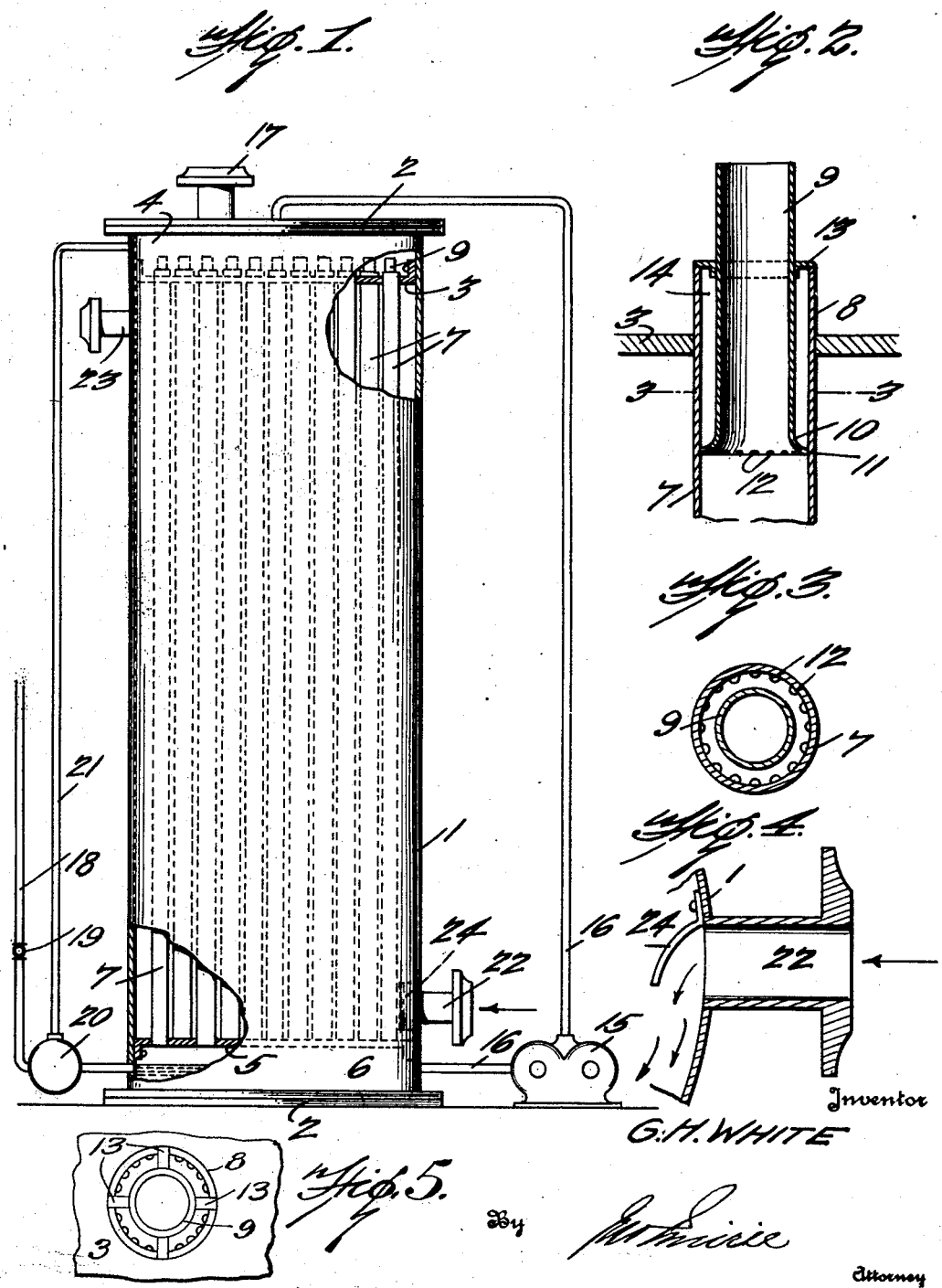
Inventor
G. H. WHITE Patented Sept. 23, 1930

1,776,483

UNITED STATES PATENT OFFICE

GEORGE HALL WHITE, OF WASHINGTON, DISTRICT OF COLUMBIA

BRINE COOLER

Application filed May 14, 1929. Serial No. 363,073.

This invention is directed particularly to a brine cooler in which brine for subsequent use as a refrigerant is automatically cooled or brought to a desired low temperature.

The primary object of the present invention is the provision of a brine cooler in which the brine is forced to circulate around and in intimate contact with the exterior of a series of pipes through which anhydrous ammonia is directed in a manner to insure the maximum cooling effect with the use of a minimum quantity of the cooling agent, the cooling effect being materially enhanced by the manner of circulating the brine in contact with the pipes.

A further object of the present invention is the provision of a brine cooler including upper and lower liquid ammonia chambers in circulatory communication, with means for permitting the gas produced in the conversion of the ammonia by the absorption of heat from the brine to freely pass to the compressor and with further means for maintaining a predetermined level of liquid ammonia in the receiving chamber of the cooler at all times to insure an adequate though minimum supply of liquid ammonia necessary to maintain a constant flow of such cooling agent lengthwise the pipes during the operation of the cooler.

The invention is illustrated in the accompanying drawings, in which:

Figure 1 is a view in elevation, partly in section, of the improved brine cooler.

Figure 2 is an enlarged sectional view of the upper portion of one of the ammonia receiving pipes.

Figure 3 is a section on line 3—3 of Figure 2.

Figure 4 is an enlarged section of the casing of the cooler through which the brine is circulated, showing more particularly the deflector for inducing a desired circular path of the brine within the casing.

Figure 5 is a broken plan view showing the upper header and illustrating particularly the mounting of the tubular deflector with respect to the ammonia tube.

The improved brine cooler includes a casing 1 which may be of any desired form in section and of any appropriate dimensions. The casing is closed at the respective ends by plates 2 and is interiorly provided in spaced relation to the upper plate 2 with a header 3 defining between said header and upper plate, an upper ammonia chamber 4. A header 5 is secured in the lower portion of the casing in spaced relation to the lower plate 2, defining a lower ammonia chamber 6.

Extending vertically of the casing 1 and secured at their respective ends in the headers 3 and 5, are a series of ammonia tubes 7. These tubes open at their lower ends through the header 5, thus communicating with the lower ammonia chamber 6 and at their upper ends the tubes extend an appreciable distance above the upper header 3, as indicated at 8 in Figure 2, the tubes at their upper ends being, of course, in open communication with the upper ammonia chamber 4.

Secured in the upper open end of each tube 7 is a tubular deflector 9. This tubular deflector has its open upper end arranged above the normal level of ammonia within the upper ammonia chamber and its lower open end, which terminates within the tube 7 below the upper header 3, outwardly flared at 10 and secured to the tube 7 at 11. The lateral flaring terminal of the tubular deflector 9 is formed with a series of perforations or openings 12, and flanges 13 of narrow width may be arranged to support the tubular deflector on the upper open end of the tube 7, the flanges being of narrow width to avoid interfering with the free passage of the ammonia into the upper open end of the tube 7. As thus arranged, the tubular deflector 9 defines a narrow vertical channel 14 concentric with the tubular deflector and between it and the inner surface of the tube 7, for a purpose which will later appear.

The liquid ammonia is circulated from the lower ammonia chamber 6 to the upper ammonia chamber 4 through the medium of a pump 15 and appropriate pipe connections 16 leading to and from the pump. The space in the upper ammonia chamber 4 above the normal level of the ammonia therein has an ammonia gas outlet 17 which leads to a compressor (not shown). The liquid ammonia from the compressor may be delivered to a storage chamber and from said chamber through a pipe 18 controlled by a hand valve 19 to the lower ammonia chamber 6.

It is important that the level of liquid ammonia be maintained constant in the lower chamber 6 and to insure this result, a float controlled valve mechanism, substantially identical in all respects with that shown in my Patent No. 1,599,447, dated September 14, 1926, is indicated at 20, a pressure equalizing pipe 21 leading from the chamber of this control mechanism to the space above the ammonia supply in the upper ammonia chamber 4. While preferring that the float controlled valve mechanism, indicated at 20, be constructed in accordance with the details described in the patent above mentioned, it is to be understood that any conventional or desired form of mechanism for this purpose may be provided. The function of this detail is to maintain a substantially constant level of liquid ammonia in the lower ammonia chamber 6 and any construction which will accomplish this result automatically is contemplated for use.

It is of course to be understood that the space within the casing 1 between the headers 3 and 5 and surrounding the pipes 7 is open to the passage of the brine, and a brine inlet 22 is provided at the lower end of such casing, a brine outlet 23 being provided at the diametrically opposite upper portion of the casing. The brine is forced through the casing or cooler and in order to insure a proper circulatory contact of the brine with the exterior surfaces of the tubes 7, a deflector 24 is secured within the casing, overlying the inlet and so directed that the incoming brine is caused to follow a circulatory path through the casing; that is to say, brine delivered through the inlet 22 under pressure is deflected laterally by the deflector 24 and thus caused to receive a swirling or circulatory action, so that the brine follows a tortuous and gradually ascending path to reach the outlet 23.

By thus causing the brine to follow what might be said to be a somewhat spiral path in its passage through the cooler, it will of course be apparent that the brine is maintained in contact with the exterior of the tubes 7 for a greater length of time and is caused to come in contact with a greater number of tubes than where the brine rises directly to the casing from the inlet to the outlet. Therefore, the brine in its passage through the cooler is of necessity brought to a minimum temperature in a short period. This will be apparent from an understanding of the fact that in order for the anhydrous ammonia to absorb the heat from the brine, an appreciable time of contact between the brine and ammonia tubes is of course necessary and if the brine were caused to merely rise in the casing from the inlet to the outlet, the movement of the brine would be necessarily slow in order to provide the necessary time for the cooling action of the ammonia. By deflecting the brine on its entrance to the casing and maintaining a constant circulatory path in substantially the nature of a spiral rising from the inlet to the outlet, the brine travels a very much longer path in the casing than would otherwise be the case and therefore the contact or duration of contact of the brine with the ammonia tubes is maintained for a greater length of time without reducing the rate of circulation. Therefore, the brine may be forced through the cooler at a comparatively rapid rate without in any way interfering with the proper cooling effect on the brine of the cooling agent.

The liquid ammonia will, by reason of the maintained level in the upper ammonia chamber 4, overflow the upper edge of the ammonia tube 7. The incoming ammonia is, by the tubular deflector 9, caused to pass in a comparatively thin film longitudinally of the tubes in contact with the inner surface of the wall thereof. The central or inner portion of each tube is thus comparatively free of liquid ammonia, and as the latter is converted into gas by the absorption of heat from the brine, this gas has a free passage vertically of the tubes 7 and tubular deflectors 9 and is delivered from the upper end of the deflectors above the level of the liquid ammonia in the upper ammonia chamber 4 for free passage through the gas outlet 17 to the compressor.

By this arrangement, a comparatively small amount of ammonia is required for an effective cooling of the brine, and there is no necessity for the developed gas forcing its way through the body of the ammonia to reach the compressor and hence the expansion valves are not required.

What is claimed to be new is:

1. A brine cooler including, a brine receiving casing having a lower inlet and an upper outlet, upper and lower headers arranged in the casing and defining upper and lower ammonia chambers, ammonia tubes within the casing opening through the headers, the ammonia tubes opening through the upper header extending appreciably above said header, deflecting tubes in the upper ends of said ammonia tubes and extending into the upper ammonia chamber, said deflecting tubes cooperating with the ammonia tubes to direct the ammonia from the upper ammonia chamber into the ammonia tubes and in a thin film lengthwise said ammonia tubes, means for maintaining a constant ammonia level in the lower ammonia chamber, means for transferring ammonia from the lower ammonia chamber to the upper ammonia chamber, and means for directing the gases from the upper ammonia chamber in condensed liquid form to the lower ammonia chamber.

2. A brine cooler including a brine receiving casing having a lower inlet and an upper outlet, upper and lower headers arranged in the casing and defining upper and lower ammonia chambers, ammonia tubes within the casing opening through the headers, the ammonia tubes opening through the upper header extending appreciably above said header, deflecting tubes in the upper ends of said ammonia tubes and extending into the upper ammonia chamber, said deflecting tubes cooperating with the ammonia tubes to direct the ammonia from the upper ammonia chamber into the ammonia tubes and in a thin film lengthwise said ammonia tubes, means for maintaining a constant ammonia level in the lower ammonia chamber, means for transferring ammonia from the lower ammonia chamber to the upper ammonia chamber, means for directing the gases from the upper ammonia chamber in condensed liquid form to the lower ammonia chamber, and means whereby the incoming brine is caused to travel in a tortuous passage lengthwise the casing between the inlet and outlet.

In testimony whereof I affix my signature.

GEORGE HALL WHITE.